2,965,605
N,N'-DIALKYL AROMATIC DIAMINES

Richard J. Reynolds, Walnut Creek, and Douglas G. Norton, Berkeley, Calif., assignors to Shell Oil Company, a corporation of Delaware No Drawing. Filed June 23, 1958, Ser. No. 744,000

7 Claims. (Cl. 260—45.9)

This invention relates to novel rubber additives, and to rubber compositions containing them. More specifically, the invention relates to new and useful N,N'-dialkyl-substituted tetraalkyl aromatic diamines and to rubber compositions comprising such compounds.

Atmospheric oxygen, which is normally present in air, and atmospheric ozone, which is photochemically produced in air, primarily by the ultraviolet component of daylight, are both harmful to rubber, but their effects differ from one another.

Upon outdoor exposure, light-catalyzed oxidation of rubber surfaces occurs which results in the formation of a skin and gives the exposed surface of the rubber a crazed appearance. Ozone, even in the low concentrations found at the bottom of the atmosphere, attacks only stressed rubber, forming cracks and checks perpendicular to the direction of stress. In such articles as tires, these ozone cracks are the focal points of failure caused by flex fatigue, which extends the cracks deeper into the rubber mass.

In order to protect rubber products from attack by oxygen and ozone, small quantities of stabilizing agents called antioxidants and antiozonants are generally incorporated in the rubber when the product is manufactured. Unfortunately, however, it has been found that antioxidant compounds generally lack antiozonant properties.

A wide variety of types of antiozonant compounds have been incorporated in both natural and synthetic rubber products, and the advantages and disadvantages of these compounds have been widely discussed in the rubber literature. In general, the properties that are desirable for an antiozonant are:

(1) Specific antiozone activity.
(2) Non-toxicity under processing and use conditions.
(3) Low vapor pressure so as to remain in the rubber during conditions of processing and use.
(4) Resistance to heat aging under conditions of use.
(5) Limited solubility in the rubber, so as to provide continual migration to the ozone-attacked surface of the rubber.
(6) Low cost, coupled with high availability.
(7) Non-staining behavior, that is, the compound must not migrate from the rubber product into adjacent substances, such as lacquered or enameled surfaces, in contact with the product.
(8) Non-discoloring behavior, that is, the antiozonant must not discolor light-colored rubber products containing it.

While many of the antiozonants in use at this time possess many of these properties, few possess them all.

Aromatic amines are one of the best-known and most frequently used types of antiozonants for rubber. Typical representatives of such amines, including the N,N'-dialkyl para-phenylene diamines, are extensively discussed in the literature; see, for example, Shaw, Ossefort and Touhey, "Antiozonants for GR–S Rubber," Rubber World 130, 636–640, August 1954. Despite the considerable use of such antiozonants in rubber, the amines are all regarded as being of the staining and discoloring type. As a consequence, their utility in such articles as gaskets for refrigerators and automobile windshields, tires or other light-colored rubber products, or in white sidewall stocks, whose light color must remain unblemished, is limited.

It is an object of our invention to provide a new class of amine antiozonants. A further object of our invention is the provision of a new class of amine antiozonants characterized by outstanding antioxidant properties. Still a further object of our invention is a new class of aromatic amine antiozonants that is non-staining, and another object is such a class of antiozonants that is non-discoloring. N,N'-dialkyl durene diamine antiozonants having these properties are yet another object of the invention as are rubber compositions having improved stability toward ozone and oxygen.

These and other objects are accomplished in our invention by compositions comprising rubber and a compound consisting of a benzene ring substituted on two carbon atoms para to one another with monovalent amino radicals, each of which is a monoalkylamino radical, and on the remaining carbon atoms with hydrocarbyl radicals. The structure of compounds of this type may be shown by the diagram

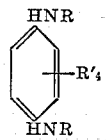

where R is an alkyl radical having from 4 to 18 carbon atoms and R' is a hydrocarbyl radical. We have found that N,N'-monoalkyl tetrahydrocarbyl aromatic diamines having less than 4 carbon atoms or more than about 18 carbon atoms in the alkyl amino substituent are inferior antiozonants compared with those having from 4 to 18 carbon atoms therein. By hydrocarbyl radical we mean a monovalent hydrocarbon radical, and such radicals may be aliphatic, such as alkyl and alkylene radicals, or they may be cyclic, such as cycloalkyl, phenyl, tolyl, benzyl and xylyl radicals. We prefer, however, to employ such N,N'-dialkyl tetrahydrocarbyl mononuclear aromatic diamines wherein the ring substituents are alkyl radicals, and most preferably those having up to eight carbon atoms since the tetraalkyl-substituted mononuclear aromatic diamines which are the starting materials for our novel compounds are more readily and inexpensively prepared than are mononuclear aromatic diamines with other types of substituents. Whatever their nature, however, the ring substituents designated by R and R' in the diagram may be the same radical, or they may be different.

The N,N'-dialkyl tetrahydrocarbyl monoaromatic diamines which serve as rubber antiozonants in our invention may be prepared in a variety of ways. They may be prepared, for example, via the method described in British patent specification 712,100, issued to Ward, Lamb and Hodgson on July 21, 1954. Examples of such diamines, having structural characteristics which render them particularly suitable for use as rubber antiozonants in our invention are:

N,N'-dibutyl tetraethyl p-phenylene diamine
N,N'- diisobutyl - 2 - ethyl - 3,5,6 - trimethyl-p-phenylene diamine
N,N'- dioctyl - 2,5 - diphenyl - 3,6 - dipropyl-p-phenylene diamine
N,N'-didodecyl-tetrapropyl-p-phenylene diamine
N,N'-di(2-butyl) tetrapropyl-p-phenylene diamine
N,N'-di-sec.butyl tetraisopropyl-p-phenylene diamine The particularly preferred class of N,N'-dialkyl tetrahydrocarbyl-substituted monoaromatic diamines that may be easily synthesized from relatively inexpensive materials in commercial supply, and that display outstanding antioxidant properties are the N,N'-dialkyl durenediamines, which may be readily prepared from dinitrodurene. Exemplary N,N'-dialkyl durenediamines include:

N,N'-diisobutyl durenediamine
N,N'-di(3-pentyl) durenediamine
N,N'-di(2,4-dimethyl-3-amyl) durenediamine
N,N'-dihexyl durenediamine
N,N'-di-2-heptyl durenediamine
N,N'-dioctyl durenediamine
N,N'-didecyl durenediamine These compounds are much more active antiozonants and are surprisingly effective in comparatively small quantities in rubber compositions. Thus, amounts as small as about 0.1% by weight are found to give rubber useful protection against ozone cracking. On the other hand, including amounts of the N,N'-dialkyl tetrahydrocarbyl mononuclear aromatic diamines above about 5% by weight does not appear to materially enhance the aging properties of the rubber, and we therefore regard quantities of the additive on the order of about 5% by weight as the most useful and economical upper limit.

The additives of the present invention may be employed in rubber in conjunction with the other materials commonly included in the course of manufacture of rubber articles. Such other materials include fillers, pigments, accelerators, wax, lubricants, and the like.

These N,N'-dialkyl tetrahydrocarbyl monoaromatic diamines, by virtue of their extensive substitution, are far less volatile than the unsubstituted p-phenylene diamines of the art. As a consequence, rubber compositions containing these compounds are free from the undesirable odors imparted by the more volatile antiozonants. Moreover, this significant reduction in volatility reduces any toxicity hazard encountered in compounding the additives in rubber stocks.

In addition, the N,N'-dialkyl aromatic diamines of our invention have a desirable accelerating effect on the curing properties of some rubber stocks. Thus, some savings may be made by decreases in accelerator levels used with standard factory stocks. Otherwise, the N,N'-dialkyl aromatic diamines of our invention do not alter the handling characteristics of these stocks or their ultimate vulcanizate properties.

The compounds described are compatible with most rubbers, both natural and synthetic, and the compositions of this invention include mixtures of the N-monoalkyl aromatic diamines with natural rubber, that is, latex derived from *Hevea brasiliensis*, as well as synthetic polyisoprene rubbers and rubbers based on butadiene or copolymers of butadiene and styrene, Buna-N rubbers based on copolymers of butadiene and acrylonitrile, neoprene rubbers prepared by polymerization of chloroprene, and butyl rubber prepared by polymerization of isobutylene with isoprene. In general, all rubbers containing residual unsaturated linkages are susceptible to attack by atmospheric ozone, and therefore the compositions of our invention are valuable in that they resist such attack and prevent surface deterioration.

The mode in which our stabilized rubber compositions are prepared is not of critical importance, and the usual compounding methods of the rubber art may be employed. Thus, the N,N'-dialkyl tetrahydrocarbyl mononuclear aromatic diamines may be added to rubber latex in the form of a finely divided solid or aqueous dispersion before coagulation, or it may be milled into the coagulated crude rubber. Other compounding methods apparent to those skilled in the art are also equally suitable.

The several modifications of our invention, as well as the objects and advantages thereof, are illustrated in the following examples. It is to be understood, however, that the examples are for the purposes of illustration only, and the invention is not to be regarded as limited to the specific materials or conditions recited therein. Unless otherwise noted, all proportions given in the examples are in parts by weight.

EXAMPLE I. — PREPARATION OF N,N'-BIS(1,3-DIMETHYLBUTYL)DURENEDIAMINE

Durenediamine and methyl isobutyl ketone, in proportions of about one mole of the diamine to six moles of the ketone, were refluxed together in admixture with about 0.5 mole percent, based on the diamine, of p-toluene sulfonic acid. The product water formed was removed as an azeotrope with the excess ketone. At the end of two hours the theoretical amount of water had been removed. The reaction mixture was then vacuum-distilled to remove the unreacted ketone, and in this manner the product N,N'-bis(1,3 dimethyl-butylidene) durenediamine was obtained in about 90% yield. Upon recrystallization, it proved to be a white crystalline solid, having a melting point of 112°–112.5° C. Analysis of this diimine gave the following data:

|  | C | H | N |
|---|---|---|---|
| Calculated for $C_{22}H_{36}N_2$ | 80.4 | 11.0 | 8.5 |
| Found | 80.5 | 11.1 | 8.4 |

The compound did not discolor on standing in air at room temperature for a year.

The diimine was completely hydrogenated over finely-divided platinum catalyst at 15° C. and 1000 p.s.i.g. hydrogen pressure. In this way an 83% yield of N,N'-bis(1,3-dimethylbutyl)durenediamine, having a melting point of 58.5°–59° C. was prepared. This diamine was a white crystalline solid, soluble in isooctane, and on analysis had the following composition.

|  | C | H | N |
|---|---|---|---|
| Calculated for $C_{22}H_{40}N_2$ | 79.5 | 12.1 | 8.4 |
| Found | 79.6 | 12.2 | 8.3 |

No discoloration was observed in a sample of the compound which was allowed to stand in air at room temperature for over a month.

EXAMPLE II.—OZONE-RESISTANT RUBBER COMPOSITIONS

The antiozonant properties of the N,N'-dialkyl durenediamine compounds of this invention were evaluated in the following manner. Both synthetic rubber tread and natural rubber sidewall strips were prepared, employing the following recipes:

| Recipe, Parts by Weight | Synthetic Rubber Tread | Natural Rubber White Sidewall |
|---|---|---|
| Synthetic Rubber (SBR-1502) | 100.0 |  |
| Pale Crepe Rubber-IX |  | 100.0 |
| Stearic Acid | 2.0 | 2.0 |
| Zinc Oxide | 3.0 | 70.0 |
| Rutile, $TiO_2$ |  | 20.0 |
| HAF Carbon Black | 50.0 |  |
| N-cyclohexyl-2-benzothiazole sulfenamide | 1.0 |  |
| Benzothiazyl Disulfide |  | 1.5 |
| Sulfur | 1.75 | 2.50 |
| Heliozone Wax | 3.0 | 3.0 |
| Antiozonant | 2.0 | 2.0 |

Equivalent samples were also prepared containing no antiozonant. All samples were cured at 292° F. to yield maximum tensile strengths (about 3500 p.s.i.). The strips so prepared were exposed to an atmosphere containing 50±5 parts of ozone per hundred million of air, at a temperature of 100° F. and at an elongation of 30% for 96 hours. At the end of the exposure, the properties and appearance of the strips were evaluated, and the results appear in the following tables. All stress-strain tests in these examples were conducted according to ASTM D412.

It will been seen from the table that the rubber samples containing N,N'-dialkyl durenediamine retained properties at least equal to those of the sample containing N,N'-dialkyl p-phenylene diamine.

EXAMPLE IV

The resistance to staining and discoloration of samples

*Antiozonant properties—Sidewall recipe*

| Antiozonant | Cure, Min. | Initial Vulcanizate Properties | | | Percent Retention of Properties After 48 Hrs., Ozone Exposure | | Visual Rating,[1] 96 Hours' Ozone Exposure |
|---|---|---|---|---|---|---|---|
| | | Tensile Strength, p.s.i. | 500% Modulus, p.s.i. | Ultimate Elongation, Percent | Tensile Strength | Ultimate Elongation | |
| None | 35 | 3,345 | 1,470 | 690 | 34 | 68 | 5 |
| 6-Ethoxy-1,2-dihydro-2,2,4-trimethyl quinoline | 15 | 3,460 | 1,690 | 685 | 65 | 77 | 1 |
| N,N'-di-3(5-methylheptyl)-p-phenylediamine | 25 | 3,320 | 1,490 | 680 | 71 | 83 | 2 |
| N,N'-di-sec-butyldurenediamine | 15 | 3,620 | 1,670 | 690 | 44 | 71 | 3 |
| N,N'-di-3(5-methylheptyl) durenediamine | 25 | 3,455 | 1,600 | 670 | 48 | 77 | 4 |

[1] 1=best. 5=worst.

*Antiozonant properties—Tread recipe*

| Antiozonant | Cure, Min. | Initial Vulcanizate Properties | | | Percent Retention of Properties After 48 Hrs., Ozone Exposure | | Visual Rating,[1] 96 Hours' Ozone Exposure |
|---|---|---|---|---|---|---|---|
| | | Tensile Strength, p.s.i. | 500% Modulus, p.s.i. | Ultimate Elongation, Percent | Tensile Strength | Ultimate Elongation | |
| None | 35 | 3,460 | 2,300 | 405 | 27 | 39 | 5 |
| 6-Ethoxy-1,2-dihydro-2,2,4-trimethyl quinoline | 45 | 3,520 | 2,220 | 430 | 69 | 67 | 1 |
| N,N'-di-3(5-methylheptyl) p-phenylenediamine | 75 | 3,555 | 2,220 | 435 | 69 | 66 | 2 |
| N,N'-di-sec-butyldurenediamine | 35 | 3,630 | 2,290 | 430 | 58 | 63 | 3 |
| N,N'-di-3)5-methylheptyl) durenediamine | 35 | 3,570 | 2,370 | 415 | 57 | 63 | 4 |

[1] 1=best. 5=worst.

It will be apparent from the tables that after ozone exposure the rubber samples containing the N,N'-dialkyl durenediamines had visual quality and physical properties comparable to those of the other antiozonants examined.

EXAMPLE III

The antioxidant properties of the antiozonants of the invention were tested by exposing samples of the white sidewall rubber strips, prepared as in Example I, in an oxygen bomb containing gaseous oxygen at a pressure of 300 p.s.i.g. for 7 days at 158° F. The results of those tests are presented in the following table:

of the white sidewall and tread rubber compositions prepared in Example II were determined.

In the staining resistance test, tread stock samples were dip-coated with one coat of white lacquer and then allowed to dry. They were then exposed for 24 hours to visible and ultraviolet light in a sun lamp cabinet. Before and after exposure the reflectance of the lacquer coat was measured with a Lumatron Model 402-E colorimeter, using a Tri-Blue filter. The standard upon which the measurements were based was a magnesium oxide-coated control panel arbitrarily rated at 100% reflectance.

In the discoloration resistance test, white sidewall stocks

*Antioxidant quality—White sidewall recipe*

| Antiozonant | Cure, Min. | Unaged Vulcanizate Properties | | | Vulcanizate Properties After Oxygen Aging | | |
|---|---|---|---|---|---|---|---|
| | | Tensile Strength, p.s.i. | 500% Modulus, p.s.i. | Ultimate Elongation, p.s.i. | Tensile Strength, p.s.i. | 500% Modulus, p.s.i. | Ultimate Elongation, Percent |
| None | 35 | 3,345 | 1,470 | 690 | 230 | | 145 |
| 6-Ethoxy-1,2-dihydro-2,2,4-trimethyl quinoline | 15 | 3,640 | 1,690 | 685 | 3,200 | 2,120 | 610 |
| N,N'-di-3(5-methylheptyl)-p-phenylenediamine | 25 | 3,320 | 1,490 | 680 | 2,410 | 1,540 | 615 |
| N,N'-di-sec-butyldurenediamine | 15 | 3,620 | 1,670 | 690 | 2,680 | 1,700 | 620 |
| N,N'-di-3(5-methylheptyl) durenediamine | 25 | 3,455 | 1,600 | 670 | 2,025 | 1,340 | 620 | were exposed for 24 hours in the sun lamp cabinet in the same manner as the tread stocks in the staining resistance tests, and the reflectance of the samples before and after the tests measured as in the staining resistance tests.

The staining and discoloration of the several antiozonants, measured in terms of loss of reflectance of the surfaces, is presented in the following table:

| Antiozonant | Discoloration Resistance | | Staining Resistance | |
|---|---|---|---|---|
| | Reflectance Before Exposure | Reflectance After Exposure | Reflectance Before Exposure | Reflectance After Exposure |
| None | 74 | 59 | 81 | 77 |
| 6-Ethoxy-1,2-dihydro-2,2,4-trimethyl quinoline | 57 | 17 | 58 | 28 |
| N,N'-di-3(5-methyl-heptyl) p-phenylene diamine | 68 | 9 | 48 | 39 |
| N,N'-di-sec.-butyl durenediamine | 69 | 40 | 72 | 62 |
| N,N'-di-3(5-methyl-heptyl) durenediamine | 74 | 50 | 78 | 75 |

It is evident from these data that the samples containing N,N'-dialkyl durenediamine antiozonant resisted discoloration and staining far better than those containing other antiozonants.

We claim as our invention:

1. A composition of matter comprising rubber containing an aromatic compound consisting of a benzene ring substituted on two carbon atoms para to one another with monovalent amino radicals, each of which is a monoalkylamino radical wherein the alkyl substituents has from 4 to 18 carbon atoms, and on each of the remaining ring carbon atoms with a hydrocarbyl radical.

2. A composition of matter comprising rubber containing a compound having the structure

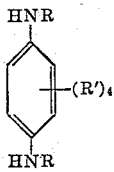

wherein each R is an alkyl radical having from 4 to 18 carbon atoms and R' is a hydrocarbyl radical.

3. A composition of matter comprising rubber containing an N,N'-dialkyldurenediamine, wherein the alkyl substituents have from 4 to 18 carbon atoms.

4. The composition of claim 3, wherein each of the alkyl substituents of the N,N'-dialkyldurenediamines has four carbon atoms.

5. The composition of claim 3, wherein each of the alkyl substituents of the N,N'-dialkyldurenediamine has six carbon atoms.

6. The composition of claim 3, wherein each of the alkyl substituents of the N,N'-dialkyldurenediamine has eight carbon atoms.

7. The composition of claim 3, wherein the N,N'-dialkyldurenediamine is N,N'-di-3(5-methylhepyl)durenediamine.

References Cited in the file of this patent

UNITED STATES PATENTS

| 2,323,948 | Von Bramer et al. | July 13, 1943 |
| 2,498,630 | Thompson | Feb. 28, 1950 |
| 2,671,807 | Prichard | Mar. 9, 1954 |
| 2,838,471 | Peterson et al. | June 10, 1958 |
| 2,851,438 | Tucker | Sept. 9, 1958 |

FOREIGN PATENTS

| 717,680 | Great Britain | Nov. 3, 1954 |